United States Patent
Smith

(10) Patent No.: US 7,216,117 B2
(45) Date of Patent: May 8, 2007

(54) SYSTEM AND METHOD FOR ADDRESS BOOK CUSTOMIZATION FOR SHARED EMESSAGING

(75) Inventor: Michael Smith, Inner Grove Heights, MN (US)

(73) Assignee: Qwest Communications Inc., Denver, CO (US)

(*) Notice: Subject to any disclaimer, the term of this patent is extended or adjusted under 35 U.S.C. 154(b) by 445 days.

(21) Appl. No.: 09/883,014

(22) Filed: Jun. 15, 2001

(65) Prior Publication Data

US 2002/0194165 A1    Dec. 19, 2002

(51) Int. Cl.
*G06F 17/30* (2006.01)

(52) U.S. Cl. .......................................... 707/3

(58) Field of Classification Search ............ 707/3, 707/2, 8, 9, 200, 1, 10, 103 R, 201, 100; 709/206, 219, 224; 379/93.09, 201.01; 345/733, 634; 703/27; 713/201, 202; 705/10; 711/123
See application file for complete search history.

(56) References Cited

U.S. PATENT DOCUMENTS

| | | | | |
|---|---|---|---|---|
| 5,293,470 | A * | 3/1994 | Birch et al. | 345/634 |
| 5,517,014 | A * | 5/1996 | Iijima | 235/492 |
| 5,878,415 | A * | 3/1999 | Olds | 707/9 |
| 5,930,764 | A * | 7/1999 | Melchione et al. | 705/10 |
| 6,108,691 | A * | 8/2000 | Lee et al. | 709/219 |
| 6,430,575 | B1 * | 8/2002 | Dourish et al. | 707/200 |
| 6,769,068 | B1 * | 7/2004 | Brozowski et al. | 726/5 |
| 2002/0029250 | A1 * | 3/2002 | Reiner | 709/206 |
| 2002/0076015 | A1 * | 6/2002 | Norwitz et al. | 379/93.09 |
| 2002/0083123 | A1 * | 6/2002 | Freedman et al. | 709/219 |
| 2002/0099723 | A1 * | 7/2002 | Garcia-Chiesa | 707/200 |
| 2002/0104018 | A1 * | 8/2002 | Singhani et al. | 713/201 |
| 2002/0120716 | A1 * | 8/2002 | Raghunathan et al. | 709/219 |
| 2002/0131573 | A1 * | 9/2002 | Berkley et al. | 379/201.01 |
| 2002/0174194 | A1 * | 11/2002 | Mooney et al. | 709/219 |

(Continued)

OTHER PUBLICATIONS

Definition of "Canonicalization" from *Wikipedia, the free encyclopedia*, http://en.wikipedia.org/wiki/Canonicalization, Jun. 15, 2006, 1 page.

(Continued)

*Primary Examiner*—Etienne P leRoux
(74) *Attorney, Agent, or Firm*—Townsend and Townsend and Crew LLP

(57) ABSTRACT

A system and method provided for limiting access to directory information in a hosted, shared access environment. In situations where a third party provides hosting on a network server of services, such as e-mail, multiple third party entities may be given access to the same directory. In this situation it may be desirable to limit access to certain portions of the directory so that one entity cannot view address information for another entity. Each entry in the directory may include a form and each form may be modified to include an additional field. The additional field may be employed to associate hierarchal information with the particular entry. Access to certain views of the directory may be then restricted and access provided to other views which include modified selection criteria. Upon access to the directory, a filtering process may be performed whereby only entries in the directory which include the same hierarchal information are employed when building a view of the directory.

15 Claims, 7 Drawing Sheets

U.S. PATENT DOCUMENTS

2002/0184191 A1* 12/2002 Marpe et al. .................. 707/3
2003/0103493 A1* 6/2003 Mercuriali et al. ......... 370/352

OTHER PUBLICATIONS

"Domino Designer (English)", *IBM Lotus Software: Lotus Documentation,* http://www.lotus.com/idd/notesua.nsf/find/designer, Jun. 5, 2006, 1 page.

Definition of "Hierarchal" from *WordReference.com Dictionary,* http://www.wordreference.com/definition/hierarchal, Jun. 15, 2006, 1 page.

"Lotus Domino Designer 6 Help", http://www-12.lotus.com/idd/doc/domino_notes/Rnext/help6_designer.nsf/855dc7fcfd5fec9a8525..., Jun. 15, 2006, 5 pages.

\* cited by examiner

```
┌────────────────────────────────────────────────────────┐
│ ⁿ⁻ Person record no. BMG Test/BMGNMTERACTAJENS    _ ☐ ✕ │
│ File  Edit  View          Text  Help                    │
│                                                         │
│                        ┌──────────────────┐            │
│     ┌──────────────────┴──────────────────┴─────────┐  │
│     │  Save and Close ☐           ☐                 │▲ │
│     │                                               │  │
│     │    PERSON  BMG Test/BMGNMTERACTAJENS          │  │
│     │    ┌──────────┐                               │  │
│     │    │Work Home │                               │  │
│     │                                               │  │
│     │    First Name      BMG                        │  │
│     │    Middle Name                                │  │
│     │    Last Name       Test                       │  │
│     │    User Name       BMG Test/BMGNMTERACTAJENS  │  │
│     │                    BMG Test,                  │  │
│ ☐   │    ──────────────────────────────────         │  │
│     │    ──────────────────────────────────         │  │
│ ☐   │    ──────────────────────────────────         │  │
│     │    ──────────────────────────────────         │  │
│ ☐   │    ──────────────────────────────────         │  │
│     │                                               │  │
│ ☐   │                                               │▼ │
│     └───────────────────────────────────────────────┘  │
│                                              80 ⌐      │
└────────────────────────────────────────────────────────┘
```

FIG.6

SYSTEM AND METHOD FOR ADDRESS BOOK CUSTOMIZATION FOR SHARED EMESSAGING

FIELD OF THE INVENTION

The present invention relates to a system and method for providing access to an address directory in a hosted emessaging environment, and more particularly to limiting access to segments of the directory when the emessaging services are provided to a plurality of third parties.

BACKGROUND OF THE INVENTION

As is well known, Lotus Notes is a groupware type of software application which allows parties to manage and access information across a number of different computing platforms. An application employed in this type of groupware may consist of several individual database designs that work together to perform a specific task. A typical Lotus Notes application may consist of a set of design elements that specify, among other things, the types of documents in the database, as well as the way that the documents can be indexed and viewed.

A database employable in the Notes environment may be resident on a networked server and may be accessible by other networked computers running compatible applications. In configurations where this type of access is provided, a Domino server program may be resident on the networked server. The Domino server program includes the logic to respond to incoming request from another computer and provide the requested information, as well as performing numerous other tasks.

One function which may be provided by a Domino server is the hosting of e-mail services, which includes the accessing and use to email information stored in a database. The networked system described above may be further configured to allow client's computers to access the database through various web based functions, such as Internet webbrowsing. The Domino hosting configuration may also be established such that all of the capabilities of a groupware product, such as Lotus Notes, may be employed by one or more entities who do not wish to build or otherwise maintain an internal infrastructure which includes the requisite hardware and software.

SUMMARY OF THE INVENTION

The inventors have recognized that in situations where hosting of database services is provided for a plurality of third parties in a single domain, certain security issues may exist, wherein each of the third parties may have access to the other parties' information. As such, the inventors have configured a centralized hosting domain which provides security for information stored therein, such that selected information associated with a particular party is not accessible by other parties who do not have the appropriate authorization.

Described herein is a method for configuring a hosted groupware solution, such as Lotus Notes/Domino Hosting, so as to provide the certain security features. According to the method, each entry in a shared directory included a form which may further include an additional field. The field is configured so that additional descriptive information may be entered. These fields may be configured such that they are only accessible by parties with the necessary authorization, such as an administrator or one who has been granted editing rights.

In one configuration of the invention, each field is provided with a formula which creates a wild card entry for hierarchal information associated with a particular entity. In one example, a user entry may further include hierarchal information, such as company, division, location, etc. employed to identify a user.

Each entry is stored in the directory may be associated with either a person or a group. When employing the formulas in the additional field, the user name field of each person document may contain a name with the user's company hierarchy. In a situation where a group entry is employed, the owner field (list owner) of each group document may contain the name with the user's company hierarchy.

As part of the method described herein, the directory may be configured with at least one view which is configured so as to only to be presented to those parties with administration and/or editing rights. In the Lotus notes environment, this view of information in the directory is commonly known as "$PeopleGroupsFlat". As part of limiting access to this particular view, as well as any mail-in or server documents from users, a duplicate view is created and an alias is provided for this duplicate view which refers back to the original view. Parties accessing the directory over the data network are provided access this duplicate view, with modified selection criteria.

When an entity accesses the hosted environment described herein, an entry for the entity making a query is identified and retrieved from the directory. As part of this directory access, identification information as well as access privileges are read from the entry. As was described above, each entry in the directory now includes a wild card entry which identifies the entity by hierarchal information. As was also stated above, access privileges to the first view of the directory are restricted, and as such, the entity accessing the directory would be denied access to that view.

A search may then be performed to locate views with the same alias as the first view. The duplicate view includes such an alias and a build is then performed for the view using the selection criteria of the duplicate view. The selection criteria limit the build to just those entries which include the same hierarchal information as the entity which is accessing the directory. The view may then be built and displayed in a web page format.

The system described herein may be configured to comprise a network interface which receives and process queries from third parties with authorization to access the directory included therein. The directory is configured to include entries which contain identification information for entities employing the system. In the configuration of the system where emessaging services are provided, the entries may include email addresses in addition to the other identification information. Also included with each entry is at least one field within which hierarchal information for the entity may be entered. The at least one field also include a formula which provides for the creation of a wild card entry which allows that particular entry to be identified by the added hierarchal information.

The interface is further configured to provide one or mores views of the information in the directory. The interface may limit access to one of the views so as to protect certain types of information. Selection criteria may be established for at least one other view such that such that when initiated the view will include entries in the directory which include the same hierarchal information as the entry for the entity accessing the system. The interface may be still further configured to present this retrieved information in a newly built web page.

BRIEF DESCRIPTION OF THE DRAWINGS

FIG. 3 discloses an example of a screen display which includes the person form.

FIG. 4 discloses an example of a screen display which includes the group form.

FIG. 6 discloses a screen displays employable to view information in the address directory with regards to a person or group.

DETAILED DESCRIPTION

Figure 1:
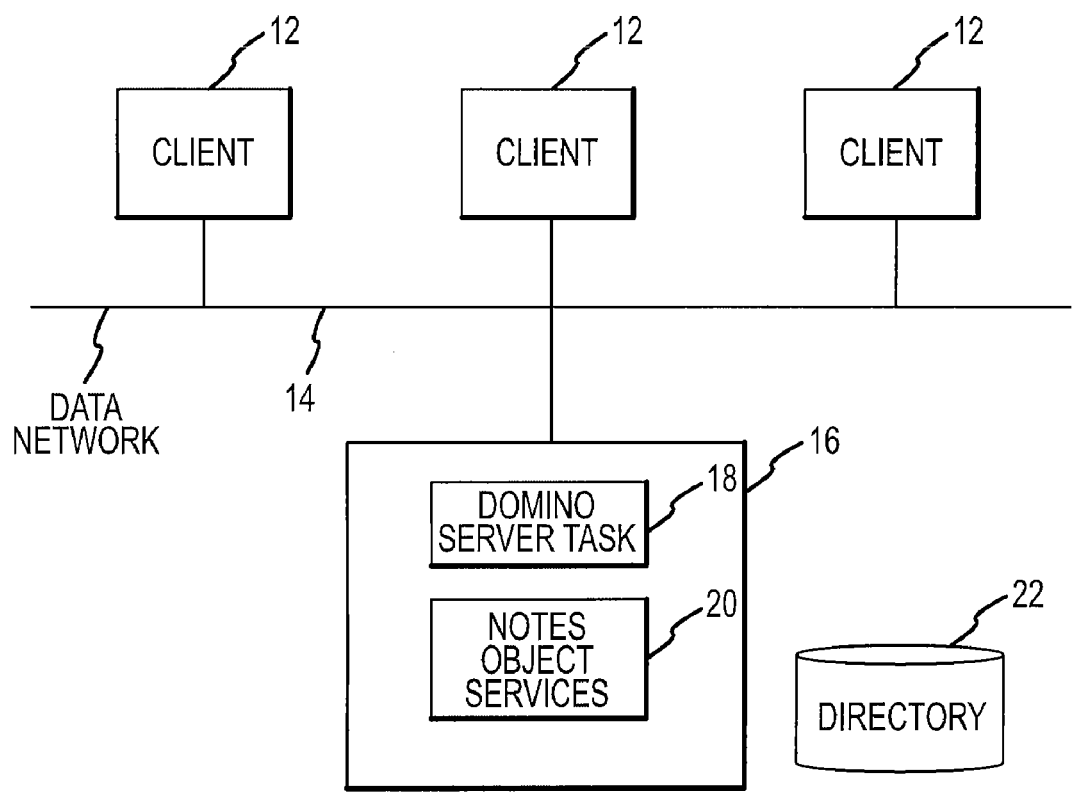
FIG. 1 discloses a system architecture within which the system described herein operates.

Disclosed in FIG. 1 is a system architecture within which the system and method described herein may operate. At a general level, the system described in FIG. 1 is a networked system, which provides for the interaction between clients machines 12 connected to a data network and at least one centrally located network server 16. To provide for communications between the components of the system, groupware applications may be resident on the server 16 and possibly on each of the client machines. One application which may be employed in this configuration is Lotus Notes which allows for sharing of information stored on the server 16 across many different types of computing platform. In the configuration shown herein, the system is specifically configured for providing emessaging (i.e., e-mail, wherein parties may access a common directory over the data network 14). As part of the system described herein, the data network 14 may comprise such well-known data networks as the Internet, a local area network (LAN), and/or wide area network (WAN).

The client machine 12 may comprise a personal computer type device connectable to the data network. Resident on each client machine may be one or more applications which provide for interactive, Window based access to databases and files which are local to the client's computer, as well as to shared databases accessible over the data network. In a Notes environment where connections are establishable to a Domino base server, a web-browser resident on the client machine may be employable to access and retrieve such information.

The server 16 may comprise any type of network server currently known which employs a well-known computing platform, such as NT or Unix. The server may include applications such as Domino Server Tasks 18. This application supports connections between client machines and the server, and also manages a set of server tasks which are programmed to either perform schedule driven database chores, such as routing messages to mailboxes and updating user accounts, or connect the various type of clients, for example, Notes and/or Web-browser, to the server. Also resident on the server is the notes object services (NOS) 18. The NOS is a set of portable C/C++ functions that create and access information in database and files, compile and interpret formulas and scripts, and interface to the operating system services in a consistent, portable way.

Also in connection with server 16 is directory 22. In the configuration of the invention showed in FIG. 1, this directory 22 is a shared database accessible by parties with authorized access to server 16. The Domino server program includes logic which in response to incoming requests from other computers, provides access to the database. Because the Dominos server programs runs only on server computers, only databases that are on Dominos server computers are read.

In the configuration of the invention shown in FIG. 1, the server 16 along with directory 22 are configured to provide hosted emessaging for a plurality of third parties. The directory includes information about persons and groups which is employable for creating, transmitting, and receiving e-mail messages. Each person and/or group may include its own entry in the database, and each entry may include a person's name, company, location, as well as e-mail address.

Figure 2:
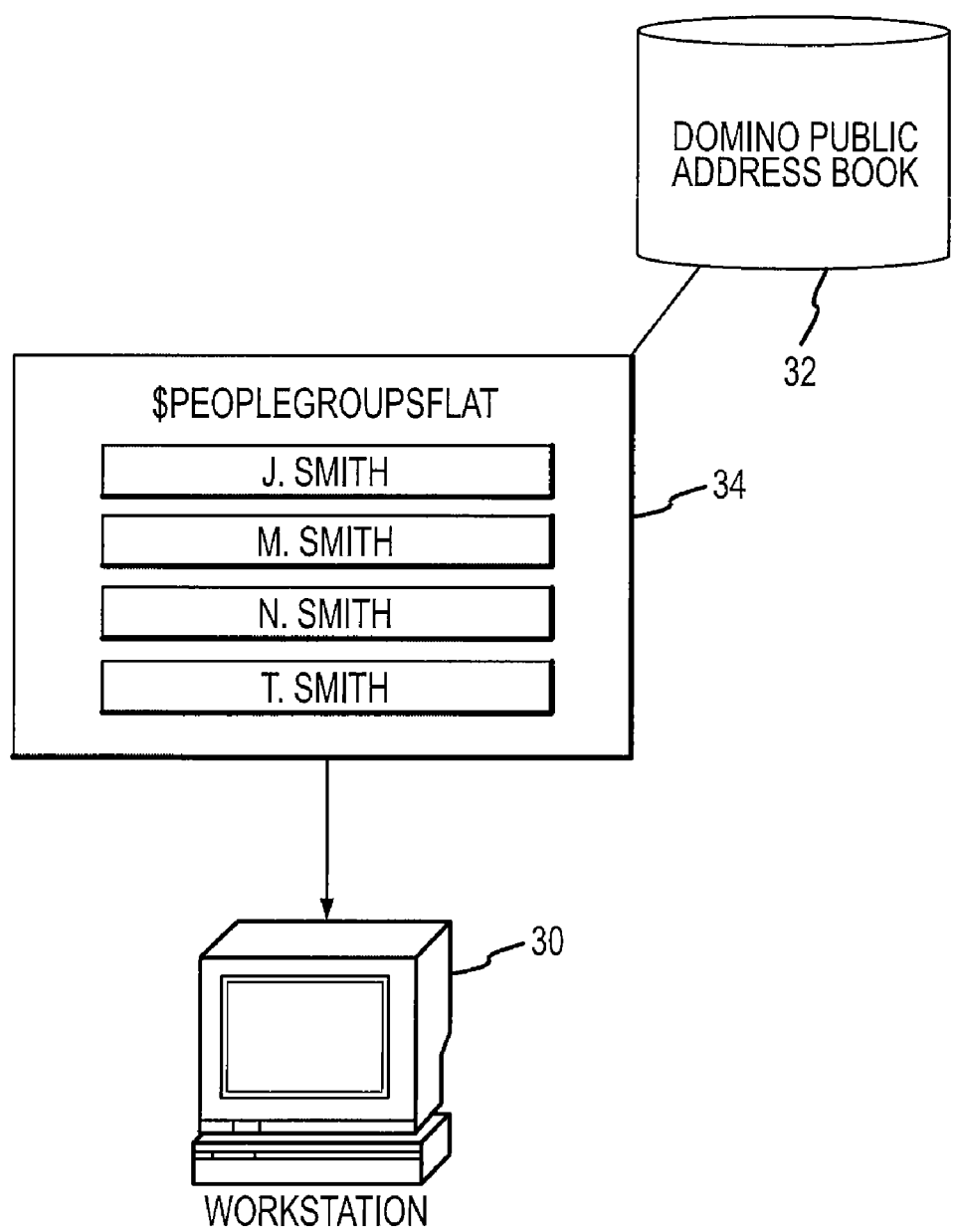
FIG. 2 discloses a block diagram which describes views provided when a party is provided access to the directory.
Figure 5:
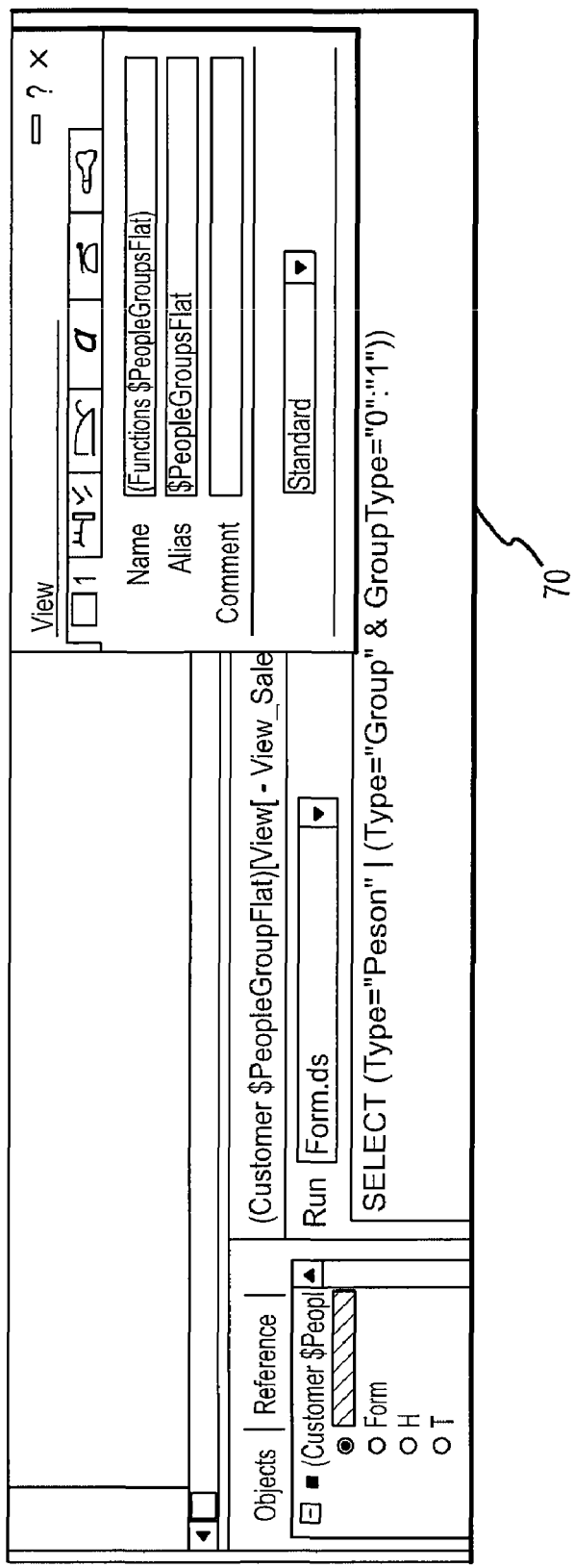
FIG. 5 discloses a screen display employable for setting the selection criteria for the copy of the address directory.

Disclosed in FIG. 2 is a diagram which provides some illustration with regards to the operation of the system described herein. Included in the directory 22 of FIG. 1 is a Domino public address book 32 within which the entries for the people and groups are stored. When an entity at a client machine wishes to employ the emessaging system described herein, they may establish a connection with the server 16 in order access the information in the directory. The client machine may employ a groupware application resident upon the machine in order to establish the connection, or in the configuration where a Domino server is employed, this connection may be established using a web browser.

When a client machine accesses the Domino public address book, a view is built which includes a listing of the entries in the directory in a predetermined format. In the Lotus Notes environment they are built as a view which is typically known as ($PeopleGroupsFlat). An example of $PeopleGroupsFlat is shown in screen display of 34. In the situation where parties are accessing over a data network using a web-browser, $PeopleGroupsFlat may be built in HTML format and displayed on user interface 30.

Many organizations today provide network hosting for e-mail services to those organizations or entities who do not wish to purchase or otherwise acquire the necessary computing assets for providing the services at their own locations. As part of this hosting service, all the above described functionality is provided on a networked server which is accessible by any number of remotely located entities. The system may be configured in such a way that a plurality of third party organizations are hosted on the same networked server, with each potentially having access to the other's information. In situations where this type of access is not desirable, the system described herein may be modified to provide the necessary security.

Figure 3:
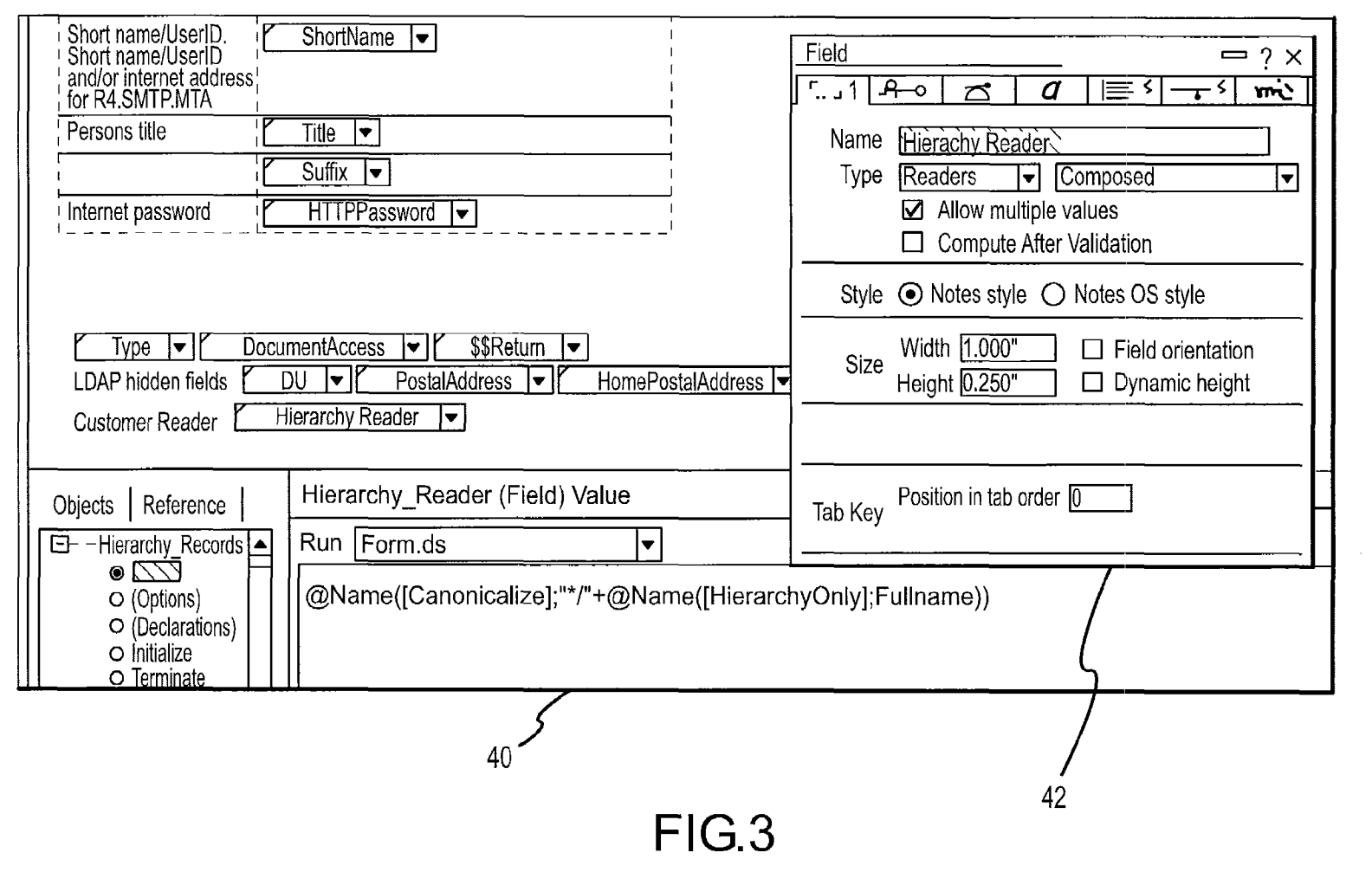

According to the method and system described herein, entries currently in the address directory may be modified to include an additional field. Typically, each entry in the directory will include its own form which presents a listing of the descriptive information for the person or group. According to the invention described herein each form may be further modified to include an additional field which is computed, and hidden except when open for editing. An example screen display 40 which includes a person form with the additional field 42 is disclosed in FIG. 3. The value of the field 42 would be set by a formula which creates a wild card entry from the hierarchal portion of a user name.

In the situation where the person form is being employed, the formula is:

@Name([Canonicalize];"*/"+@Name([Hierarchy-Only];Fullname))

The readers field 42 allows multiple values to accommodate possible multiple values in the FullName field of the person document. If an entry in the FullName field is non hierarchal the [canonicalize] action in the formula supplies hierarchal elements from the current user's ID. This is acceptable since the current user will be an administrator working interactively or the server operating via an agent.

Figure 4:
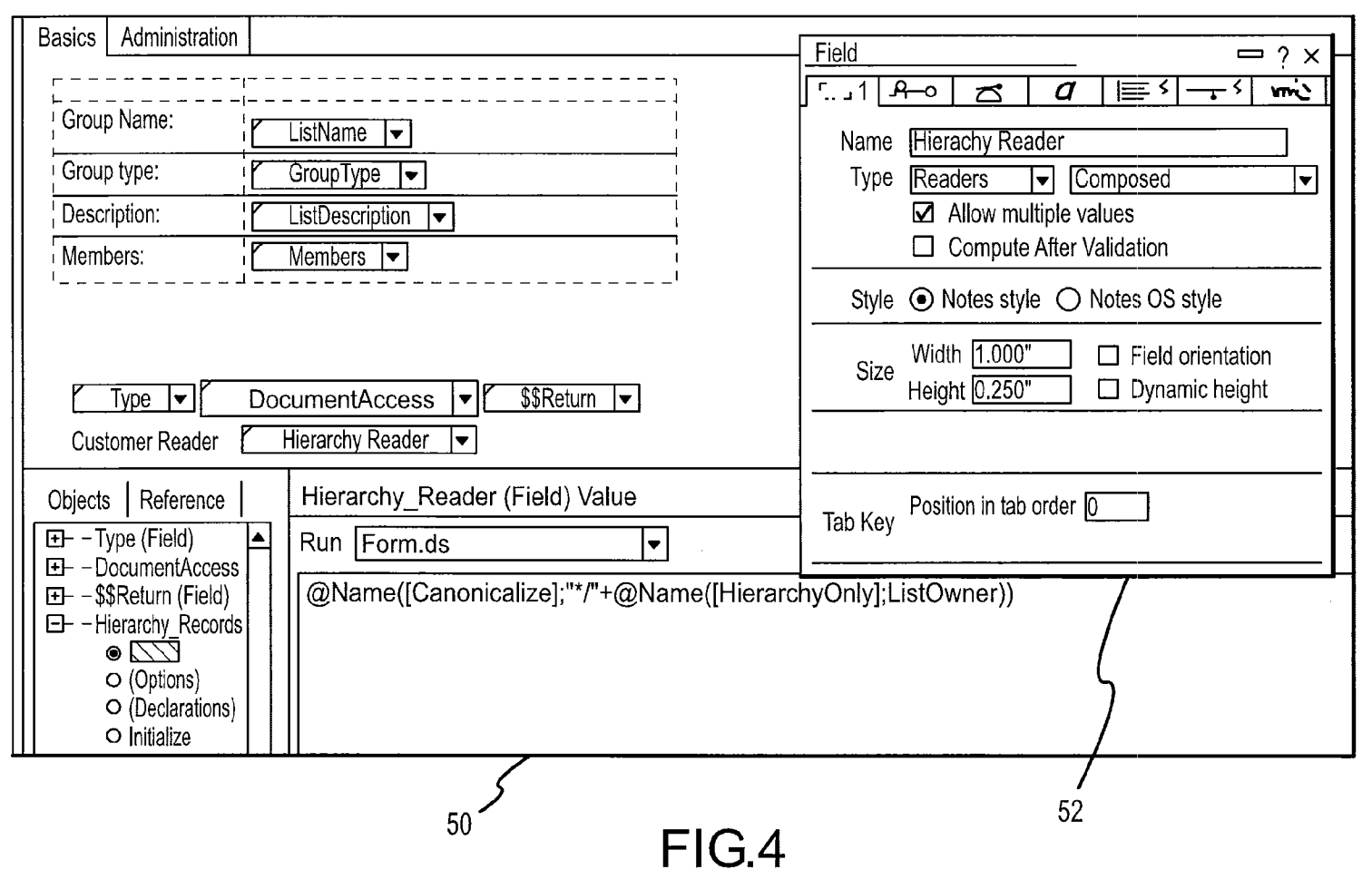

Disclosed in FIG. 4 is a screen display 50 for a group form which further includes group field 52. The Group field provides the same function for a group form as the Person field described above. The formula for modifying the Group form is as follows:

@Name([Canonicalize];"*/"+Name([HierarchyOnly]; ListOwner))

For both these formulas to work correctly it is necessary that the user name field (FullName) of each person document contain a name with the user's company hierarchy, and the owner field (ListOwner) of each group document contain a name without user's company hierarchy. For example, a hierarchy may read "*/ACME/INTERACT/US." In this example it is seen that it could read that it's the company name, division within the company, and geographical location. When these requirements are met, the formula will populate the reader's field with a wild card entry which includes the hierarchal information.

In order to further implement the system and method described herein, access privileges to the address directory are modified such that access is substantially limited to the $PeopleGroupFlat view. As such, entities accessing the system described herein will typically not be provided the $PeopleGroupsFlat view. By limiting access in this manner the display of mail/database in server documents can be eliminated.

In order to provide access to information in the directory, a copy of $PeopleGroupsFlat may be created and named something such as (Customer $PeopleGroupsFlat). This duplicate view includes modified selection criteria which may be defined by the following formula:

(Type="Person"|(Type="Group"& GroupType="0": "1"))

In operation, when access is initially denied to the $PeopleGroupsFlat view, the Domino server will use any view with the alias of $PeopleGroupsFlat to which the user has access. In this case it will be Customer $PeopleGroupsFlat. The selection criteria modify the view provided such that only entries with matching hierarchal information are displayed.

When access is provided to the directory, the views discussed above will not be properly built unless there is an appropriate hierarchal name in the expected location. When creating person and group documents, the required fields must the populated with the appropriate hierarchal name. Disclosed in FIG. 6 is a screen display 80 which displayed when a build is performed. As can be seen, the User name portion includes all the necessary hierarchal information so that the user can be properly identified. With this additional information in place, this will ensure that all users from a particular organization can see a particular user's person form. When creating a group form, an entry on the owner field must contain the proper hierarchy for the user's company.

Figure 7:
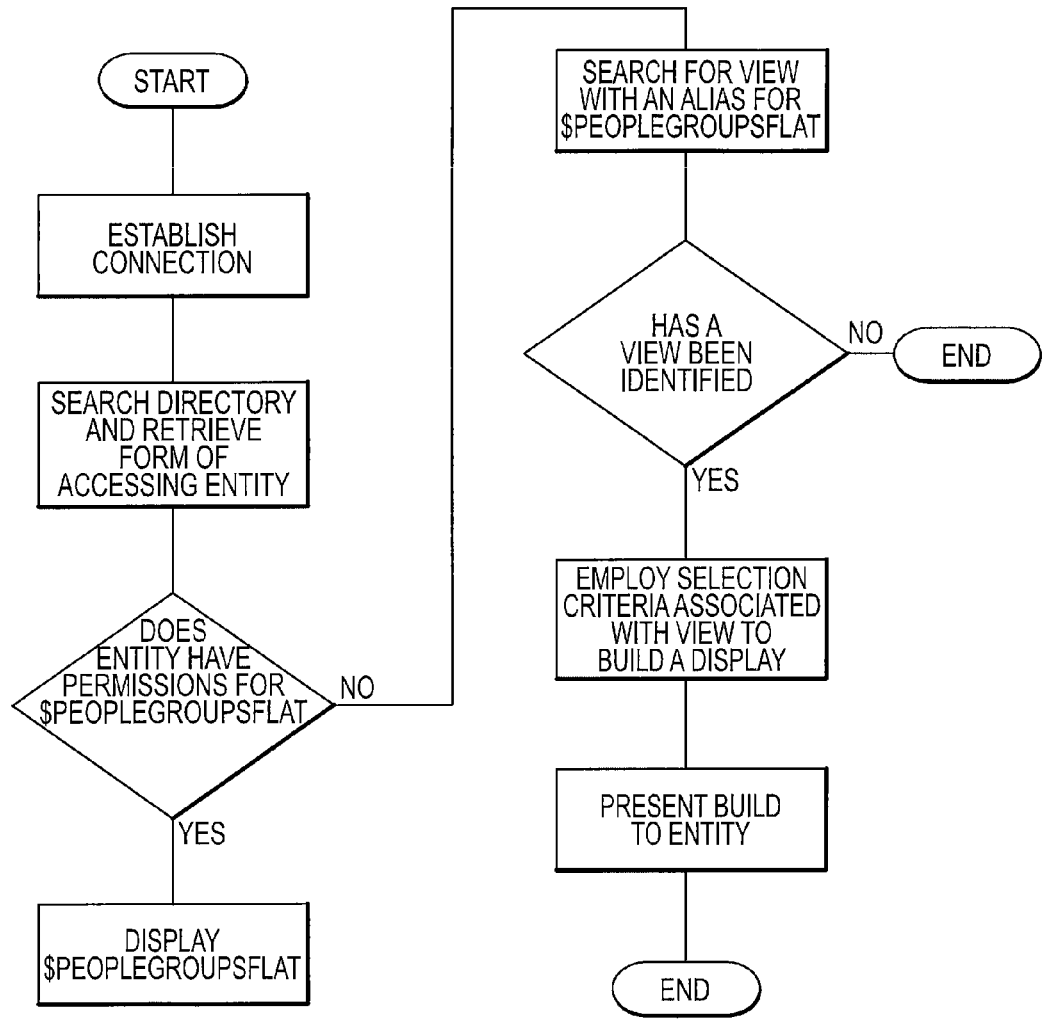
FIG. 7 discloses a flow chart which describes the operations of the system with regards to providing access to information in the directory.

Disclosed in FIG. 7 is a flow chart which describes the steps performed by a system which includes the modifications described herein. When an entity wishes to send an e-mail, initially, a connection is established over the data network with the Domino server using a web-browser. As part of the connection to the system, an entry for the entity in the database may be identified and the person or group form accessed in order to retrieve the authorizations which the entity has for using the e-mail system.

Once this information is retrieved, a query is made as to whether the entity has access to the ($PeopleGroupsFlat). As was described above in discussing the configuration of the system, most parties will denied access to this view. As such, the system will then seek out any view with an alias of $PeopleGroupsFlat to which the user has access. Once the (Customer $PeopleGroupsFlat) view is located, the selection criteria or the particular view are employed to filter through only those entries in the directory which match the hierarchal information of the entity that has established the connection. A view is then built including only this information and presented to the entity as an html page accessible by a web browser.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method for presenting address information to accessing parties in a shared directory environment, the method comprising:
   detecting a query from at least one entity over a data network seeking a first view of at least one address entry in a shared directory;
   retrieving identification information for the at least one entity, wherein the identification information includes hierarchal information associated with the at least one entity;
   denying access to the first view;
   searching the shared directory to identify address entries in the shared directory which includes a plurality of address entries, each of the address entries including hierarchal information in a canonical form in a hidden field, wherein searching the shared directory comprises matching the hierarchal information in the canonical form in the hidden field to the hierarchal information associated with the at least one entity initiating the query; and
   presenting to the at least one entity initiating the query only identified address entries in a second view.

2. The method of claim 1 wherein the shared directory is configurable for supporting emessaging.

3. The method of claim 1 wherein the at least one entry include the identification information for at least one of: a person and a group.

4. The method of claim 1 wherein the hierarchal information includes at least one of: company name and company location.

5. The method of claim 1 wherein the first view is a listing of all entries in the directory and the second view is a copy of the listing with modified selection criteria.

6. A system for providing limited access to address entries in a directory in a shared environment, the system comprising;
- a network server configured for receiving and processing queries from one or more entities of a plurality of entities for accessing directory information over at least one data network and performing functions with regards to accessing associated directories;
- a shared directory in communication with the server which includes a plurality of address entries, each of the address entries including hierarchal information in a canonical form in a hidden field, the hierarchal information being associated with at least one entity of the plurality of entities having access to the shared directory; and
- wherein the network server is further configured to search the shared directory and, based on the queries, generate a first and at least one additional view of the address entries, wherein access to the first view is restricted and the at least one additional view is a subset of the first view and wherein the at least one additional view provides access to only those address entries in the first view for which the hierarchal information matches identification information for the one or more entities making the queries.

7. The system of claim 6 wherein the data network is the internet and the server is configured to communicate with web browsers.

8. The system of claim 6 wherein the server and directory are configured to provide hosted emessaging services for a plurality of third parties.

9. The system of claim 8 wherein the first view comprises a listing of all entries and the at least one additional view is a copy of the listing of all entries with the modified selection criteria.

10. The system of claim 6 wherein the fields are provided for at least one of: people entries and group entries in the directory.

11. A method for presenting address information to accessing parties in a shared directory environment, the method comprising:
- detecting a query from at least one entity over a data network seeking a first view of at least one address entry in a shared directory, wherein the shared directory comprises a Lotus Domino server public address book which includes a plurality of address entries, each of the address entries including hierarchal information in a canonical form in a hidden field;
- retrieving identification information for the at least one entity, wherein the identification information includes hierarchal information associated with the at least one entity;
- denying access to the first view;
- searching the shared directory to identify address entries in the shared directory wherein searching the shared directory comprises matching the hierarchal information in the canonical form in the hidden field to the hierarchal information associated with the at least one entity initiating the query; and
- presenting to the at least one entity initiating the query only identified address entries in a second view.

12. The method of claim 11, wherein the at least one entry includes the identification information for at least one of: a person and a group.

13. The method of claim 11, wherein the hierarchical information includes at least one of: a company name and company location.

14. The method of claim 11, wherein the first view comprises a listing of all entries in the directory.

15. The method of claim 14 wherein the second view comprises a copy of the listing with modified selection criteria.

* * * * *